United States Patent
McGreer et al.

(10) Patent No.: US 6,735,363 B1
(45) Date of Patent: May 11, 2004

(54) WAVEGUIDE-GRATING ROUTER WITH OUTPUT TAPERS CONFIGURED TO PROVIDE A PASSBAND THAT IS OPTIMIZED FOR EACH CHANNEL INDIVIDUALLY

(75) Inventors: Kenneth McGreer, Fremont, CA (US); Liang Zhao, Sunnyvale, CA (US); Jane Lam, San Jose, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 72 days.

(21) Appl. No.: 10/096,124

(22) Filed: Mar. 8, 2002

(51) Int. Cl.[7] .................................................. G02B 6/34
(52) U.S. Cl. .............................. 385/37; 385/24; 385/46
(58) Field of Search .............................. 385/14, 24, 28, 385/31, 37, 39, 43, 46, 50

(56) References Cited

U.S. PATENT DOCUMENTS

| | | | |
|---|---|---|---|
| 5,854,868 A | 12/1998 | Yoshimura et al. | 385/50 |
| 6,069,990 A | 5/2000 | Okawa et al. | 385/43 |
| 6,466,715 B1 * | 10/2002 | Akiba et al. | 385/37 |

FOREIGN PATENT DOCUMENTS

| | | | |
|---|---|---|---|
| JP | 197735 | 7/1998 | G02B/6/122 |
| JP | 091765 | 4/2001 | G02B/6/12 |

OTHER PUBLICATIONS

Amersfoort, Martin, "Arrayed Waveguide Grating Design, simulation and layout using Prometheus DV," Jun. 15, 1998 http://www.kymata.com/kymatasoftware/supportnotes/A1998003.html.

* cited by examiner

Primary Examiner—Phan T. H. Palmer
(74) Attorney, Agent, or Firm—Amin & Turocy, LLP

(57) ABSTRACT

An optical integrated circuit (OIC) or optical apparatus upon which a waveguide-grating router (WGR) device is fashioned is provided, where the circuit is configured to optimize a passband for each channel transmitted on an output waveguide. The WGR has two or more waveguides of varying widths optically coupled to a slab waveguide. The widths can be configured to facilitate producing a substantially uniform frequency-limited bandwidth, a substantially uniform wavelength-limited bandwidth, a substantially uniform isolation value, and/or a substantially uniform value for insertion loss between the output waveguides, which in turn facilitates producing optical data communication devices with more consistent transmission parameters and higher quality. In addition to various widths, the shape of the delivering end of a slab waveguide can be fashioned to further improve the consistency and quality of such parameters.

36 Claims, 9 Drawing Sheets

WAVEGUIDE-GRATING ROUTER WITH OUTPUT TAPERS CONFIGURED TO PROVIDE A PASSBAND THAT IS OPTIMIZED FOR EACH CHANNEL INDIVIDUALLY

TECHNICAL FIELD

The present invention generally relates to optical integrated circuits and more particularly to a waveguide-grating router (WGR), which is based on an arrayed-waveguide grating (AWG), associated with improving wavelength division multiplexing, including dense wavelength division multiplexing (DWDM).

BACKGROUND OF THE INVENTION

As the amount of data traffic increases in optical networks, it becomes increasingly important to provide improved wavelength division multiplexing, demultiplexing and routing devices. One such device is a waveguide-grating router WGR that facilitates DWDM. DWDM allows multiple beams of light of different wavelengths carrying separate data channels to be transmitted along a single optical fiber. WGR devices can be employed to combine and/or separate optical signal carrying data channels coded in light beams with different wavelengths.

One technique for fabricating a waveguide-grating router is planar lightwave circuit (PLC) technology. A typical PLC comprises planar waveguides and/or channel waveguides. Examples of planar and channel waveguides are shown in H. Kogelnik, *Theory of Optical Waveguides,* Guided-Wave Optoelectonics T. Tamir ed., Springer-Verlag, Berlin, 1988, and also by H. Nishihara, M. Haruna, and T. Suhara, *Optical Integrated Circuits,* McGraw Hill, New York, 1987.

In a planar (or slab) waveguide, light is generally restricted to propagate in a region that is thin (typically between 3 $\mu$m and 30 $\mu$m) in one dimension, referred to herein as the lateral dimension or height, and extended (typically between 1 cm and 100 cm) in the other two dimensions. Herein, "slab waveguide" does not necessarily imply that the waveguide comprises layers of uniform refractive index, rather "slab waveguide" may refer to, but is not limited to, any type of planar waveguide, including graded index planar waveguides. Herein, we refer to the plane that is perpendicular to the lateral dimension of the PLC as the plane of the PLC. The longitudinal direction is defined to be the direction of propagation of light at any point on the PLC. Further, the lateral direction is defined to be perpendicular to the plane of the PLC and the transverse direction is defined to be perpendicular to both the longitudinal and the lateral directions.

In a channel waveguide, light has an optical field that is substantially confined in both the lateral direction and the transverse direction. In a typical channel waveguide, the field is substantially confined within a region that extends between 3 $\mu$m and 30 $\mu$m in the lateral direction, herein referred to as the height, and extends between 3 $\mu$m and 100 mm in the transverse direction, herein referred to as the width.

There are various approaches to building a PLC. In a typical example of a PLC, a slab waveguide comprises three layers of silica glass with the core layer lying between the top cladding layer and the bottom cladding layer. Channel waveguides are often formed by at least partially removing (typically with an etching process) core material beyond the transverse limits of the channel waveguide and replacing it with at least one layer of side cladding material that has an index of refraction that is lower than that of the core material. The side cladding material is usually the same material as the top cladding material. Further, each layer may be doped in a manner such that the core layer has a higher index of refraction than either the top cladding or bottom cladding. When layers of silica glass are used for the optical layers, the layers are typically deposited on a silicon wafer. As a second example, slab waveguides and channel waveguides comprise three or more layers of InGaAsP and adjacent layers can have compositions with different percentages of the constituent elements In, P, Ga, and As. As a third example, one or more of the optical layers of the slab waveguide and/or channel waveguide may comprise an optically transparent polymer. A fourth example of a slab waveguide comprises a layer with a graded index such that the region of highest index of refraction is bounded by regions of lower indices of refraction. A doped-silica waveguide is usually preferred because it has a number of attractive properties including low cost, low loss, low birefringence, stability, and compatibility for coupling to fiber.

In addition to the channel and slab waveguides described above, various PLCs may comprise at least one optical dispersive region such as, for example, an arrayed waveguide. Typically, a waveguide-grating router (WGR) is a planar lightwave circuit and comprises at least one input channel waveguide, an input slab waveguide, an arrayed-waveguide grating (AWG), an output slab waveguide, and at least one output channel waveguide. Herein, the term "input waveguide" implies "input channel waveguide" and "output waveguide" implies "output channel waveguide;" however, "input slab waveguide" does not imply "input channel waveguide" and "output slab waveguide" does not imply "output channel waveguide."

The arrayed-waveguide grating comprises an array of waveguides. The length of the $i^{th}$ waveguide in the AWG is denoted as $L_i$. The angular dispersion that is provided by the AWG is determined in part by the difference in length between adjacent waveguides, $L_{i+1}-L_i$. The details of construction and operation of the WGR are described in M. K. Smit and C. Van Dam, *PHASAR-Based WDM-Devices: Principles, Design, and Application,* IEEE Journal of Selected Topics in Quantum Electronics, Vol. 2, No. 2, pp. 236–250 (1996); K. McGreer, *Arrayed Waveguide Gratings For Wavelength Routing,* IEEE Communication Magazine, Vol. 36, No. 12, pp. 62–68 (1998); and K. Okamoto, *Fundamentals of Optical Waveguides,* pp. 346–381, Academic Press, San Diego, Calif., USA (2000). Each of the publications and patents referred to in this application is herein incorporated by reference in its entirety.

Such WGRs are measured by performance parameters like insertion loss, isolation, uniformity of output signal, number of channels and data throughput, for example. As with any filter, WGRs do not perform the wavelength selection involved in (de)multiplexing perfectly. Such imperfect selection can lead to reduced isolation. Isolation concerns the difference between the signal power and the unwanted noise in the passband. The number of channels depends, at least in part, on the transfer function associated with each channel.

The transfer function describes the optical coupling between a particular input waveguide and a particular output waveguide as a function wavelength of light; the spectral transmissivity (i.e. the spectrum) describes the optical power that is coupled between a particular input waveguide and a particular output waveguide as a function wavelength of light (or, equivalently, as a function of frequency of light); the passband refers to a peak region in the spectral transmissivity associated with a particular input waveguide and a particular output waveguide; and herein "insertion loss" refers to the maximum value of transmissivity within the passband. Typically, the passband refers to the portion of the spectral transmissivity that is greater than about −20 dB below the insertion loss. Each passband is characterized by a central wavelength, a central frequency, and one or more values associated with the width of the passband. However, conventionally, the passbands associated with the light beams of different wavelengths may not have been consistent across the output waveguides, and thus, improved WGR operation is desired.

The term "bandwidth" refers to a parameter that characterizes the width of a passband; however, the term can be used in more than one way according to the context in which it is used or according to clarifying definitions imposed upon it for a particular context. Generally, bandwidth refers to the value of a wavelength range or a frequency range for which the transmissivity of a particular passband is greater than or equal to a particular reference level for all polarization states of light. Typical examples of reference levels are 0.5 dB, 1 dB and 3 dB below the maximum transmissivity of the particular passband. Herein, "frequency-limited bandwidth" will refer to a value of bandwidth that is specified in frequency and will be denoted as $\delta v$; and "wavelength-limited bandwith" will refer to a value of bandwidth that is specified in wavelength and will be denoted as $\delta \lambda$. "Frequency-limited bandwidth" and "wavelength-limited bandwith" will not imply any particular reference level; however, any suitable reference level may be used in association with either term as used herein.

In addition to the passband, the stopband affects the performance of a WGR. The stopband refers to the portion of the spectral transmissivity (which, again, is determined by the transfer function) that is not within the passband. The stopband affects, for example, the adjacent channel isolation. Adjacent channel isolation refers to the degree to which one output waveguide rejects light that is intended to be maximally coupled into an adjacent output waveguide. When the adjacent-channel isolation is determined over a range of wavelengths, it is referred to herein as the wavelength-limited adjacent isolation. When the adjacent-channel isolation is determined over a range of frequencies, it is referred to herein as the frequency-limited adjacent isolation.

One type of WGR is a Gaussian-passband WGR (G-WGR). In a G-WGR, the length difference between adjacent waveguides of the AWG, $L_{i+1}-L_i$, is substantially independent of i (i.e., $L_{i+1}-L_i$ is substantially constant throughout the AWG.). This type of WGR is described in K. Okamoto, *Fundamentals of Optical Waveguides*, pp. 346–360, Academic Press, San Diego, Calif., USA (2000). The shape of the passband is determined by the convolution of two fields. The first field in the convolution is the field that is formed from the light that passes through the AWG and is imaged onto the output focal curve. The second field in the convolution is the fundamental mode of the output waveguide. In the G-WGR, both fields in the convolution are substantially Gaussian, and, consequently, the passband is substantially Gaussian.

Another type of WGR is a passband-flattened WGR (PF-WGR). The passband of the PF-WGR is typically broader than the passband of a G-WGR. In this context, a passband that is relatively broad refers to a passband having a value of flatness that is relatively large wherein flatness is defined as the −1 dB bandwidth divided by the −20 dB bandwidth. Typically, a G-WGR has a passband flatness of approximately 0.22, and typically a PF-WGR is required to have a flatness of 0.3 or larger. A broad passband is advantageous for applications that require the passband to be broader than can be provided by the G-WGR. There are a variety of techniques to flatten the passband of an WGR. One technique for broadening the passband of a WGR involves the introduction of a parabolic taper (horn) between the slab waveguide and the channel waveguide at either the input side or the output side. An example of a PF-WGR optical router is disclosed in K. Okamoto and A. Sugita, *Flat Spectral Response Array-Waveguide Grating Multiplexer With Parabolic Waveguide Horns,* Electronics Letters, Vol. 32, No. 18, pp. 1661–1662 (1996).

WGRs attempt to provide substantial uniformity in passband throughout the output channels so that, for example, a first output channel carrying waves of a first wavelength has the same parameters (e.g., bandwidth, isolation, and insertion loss, etc.) as a second output channel carrying waves of a second wavelength. Since WGRs are commonly employed to multiplex and/or demultiplex channels, parameters associated with the passband are therefore important in determining the separation between channels and thus the number of channels available in such a (de)multiplexer. WGRs with improved characteristics are desired.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Conventionally, the receiving ends of output waveguides that receive light from a WGR are the same width at the point where they are optically connected to an output slab waveguide. One aspect of the present invention concerns improving WGR performance by providing receiving ends of output waveguides that are of various widths to facilitate providing a transfer function that is optimized for each individual output waveguide. For example, various widths may be provided to facilitate improved uniformity of a figure of merit, which may include, but is not limited to, frequency-limited bandwidth, wavelength-limited bandwidth, adjacent isolation, or insertion loss.

In conventional WGRS, the delivering end of the output slab waveguide is not fashioned to account for improvements that can be achieved by positioning the receiving ends of the output waveguides at precise locations relative to an output focal curve. One aspect of the present invention concerns improving WGR performance by shaping the delivering end of the output slab waveguide to facilitate positioning the receiving ends of the output waveguides at desired locations relative to the output focal curve. For example, a delivering end may be provided to facilitate improved uniformity of a figure of merit, which may include, but is not limited to, frequency-limited bandwidth, wavelength-limited bandwidth, adjacent isolation, or insertion loss.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Prior Art

Prior Art

Prior Art

DETAILED DESCRIPTION OF THE INVENTION

Figure 1:
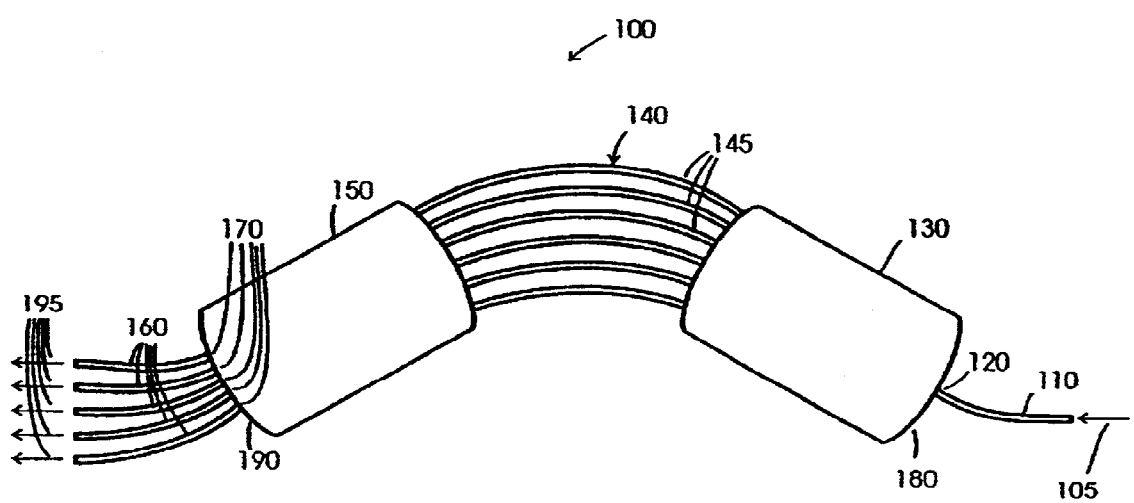
FIG. 1 is a schematic diagram of a portion of a WGR illustrating input waveguide, input slab waveguide, arrayed-waveguide grating, output slab waveguide and output waveguides in accordance with an aspect of the present invention.

The present invention is now described with reference to the drawings, where like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate description of the present invention.

Herein, the width of an element refers to the extent of the element in the transverse direction and the length of an element refers to the extent of the element in the longitudinal direction. Herein, "width of a channel waveguide" refers to the width of the core region that comprises the channel waveguide, i.e., the extent of the outermost cladding regions are not considered in the determination of the width of a channel waveguide. Herein, where "input waveguide" and "output waveguide" each refer to a channel waveguide, and "width of the input waveguide" and "width of the output waveguide" each refer to width of a channel waveguide.

Herein, "input" and "output" are used to identify particular elements and are not meant to imply a particular direction of propagation of light. For example, light may enter an output waveguide and emerge from an input waveguide. Likewise, "receiving end" and "delivering end" are used to identify particular elements and are not meant to imply a particular direction of propagation of light. For simplicity, the following discussion will assume that light enters the input waveguide and emerges from the output waveguide; furthermore, the following discussion will assume that light enters the receiving end of a particular element and emerges from the delivering end. However, the invention is not so limited to these assumptions.

Referring initially to FIG. 1, a schematic diagram illustrates a portion of an exemplary WGR 100 that can be located, for example, on an optical integrated circuit. The WGR 100 comprises an input waveguide 110, an input slab waveguide 130, an output slab waveguide 150, and a plurality of output waveguides 160. The input slab waveguide 130 is optically coupled to the output slab waveguide 150 via an arrayed-waveguide grating (AWG) 140, which comprises a number of waveguides 145 of various lengths. The delivering end of the input waveguide 120 is optically coupled to the receiving end of the input slab waveguide 180. The receiving ends of the output waveguides 170 are optically coupled to the delivering end of the output slab waveguide 190. The exemplary WGR 100 illustrated is a 1×5 demultiplexer and, as such, one input waveguide 110 is illustrated and five output waveguides 160 are illustrated. It is to be appreciated that the present invention can be employed in devices having more than one input waveguide.

Further, although FIG. 1 illustrates input light 105 entering the input waveguide 110 and extracted light 195 emerging from the output waveguides 160, it is to be appreciated that the present invention can be employed in devices wherein the direction of propagation of light is reversed. That is, although the WGR 100 is illustrated to be providing a demultiplexing function, the present invention can also be employed in a WGR that provides a multiplexing function. Furthermore, the invention may also be applied to a WGR having a plurality of inputs and a plurality of outputs and the WGR may provide a wavelength routing function that is more complex than either demultiplexing or multiplexing. While a demultiplexer is illustrated and described, it is to be appreciated that the present invention can be employed in devices including, but not limited to, a 1×N demultiplexer, an N×1 multiplexer, and an N×M router, where N and M are integers individually from about 1 to about 200. In another embodiment, N and M are integers individually from about 1 to about 100.

In operation as a 1×5 demultiplexer, multi-wavelength light 105 enters the input waveguide 110. The light propagates from the delivering end of the input waveguide 120 to the receiving end of the input slab waveguide 180. The input slab waveguide 130 divides the incoming power onto various waveguides 145 of various lengths to facilitate phase shifting in the AWG 140. The divided power arrives at a second slab waveguide region 150 where, due at least in part to phase tilt produced by the AWG 140, light beams of substantially separate wavelengths 195 can be directed onto separate locations along the delivering end of the output slab waveguide 190. Herein, "output focal curve" refers to a curve upon which an AWG focuses a beam of monochromatic light that emerges from it. Hence, provided that the output focal curve lies within the output slab waveguide, a beam of monochromatic light that emerges the AWG and propagates through the output slab waveguide converges to its narrowest transverse extent at the output focal curve. The significance of the output focal curve is further discussed with reference to FIG. 6 and FIG. 7 below. In the conventional WGR, the output focal curve coincides with the delivering end of the output slab waveguide.

The light beams of substantially separate wavelengths 195 propagate from the delivering end of the output slab waveguide 190 into the receiving ends of the output waveguides 170 and propagate along the output waveguides 160.

Figure 2:
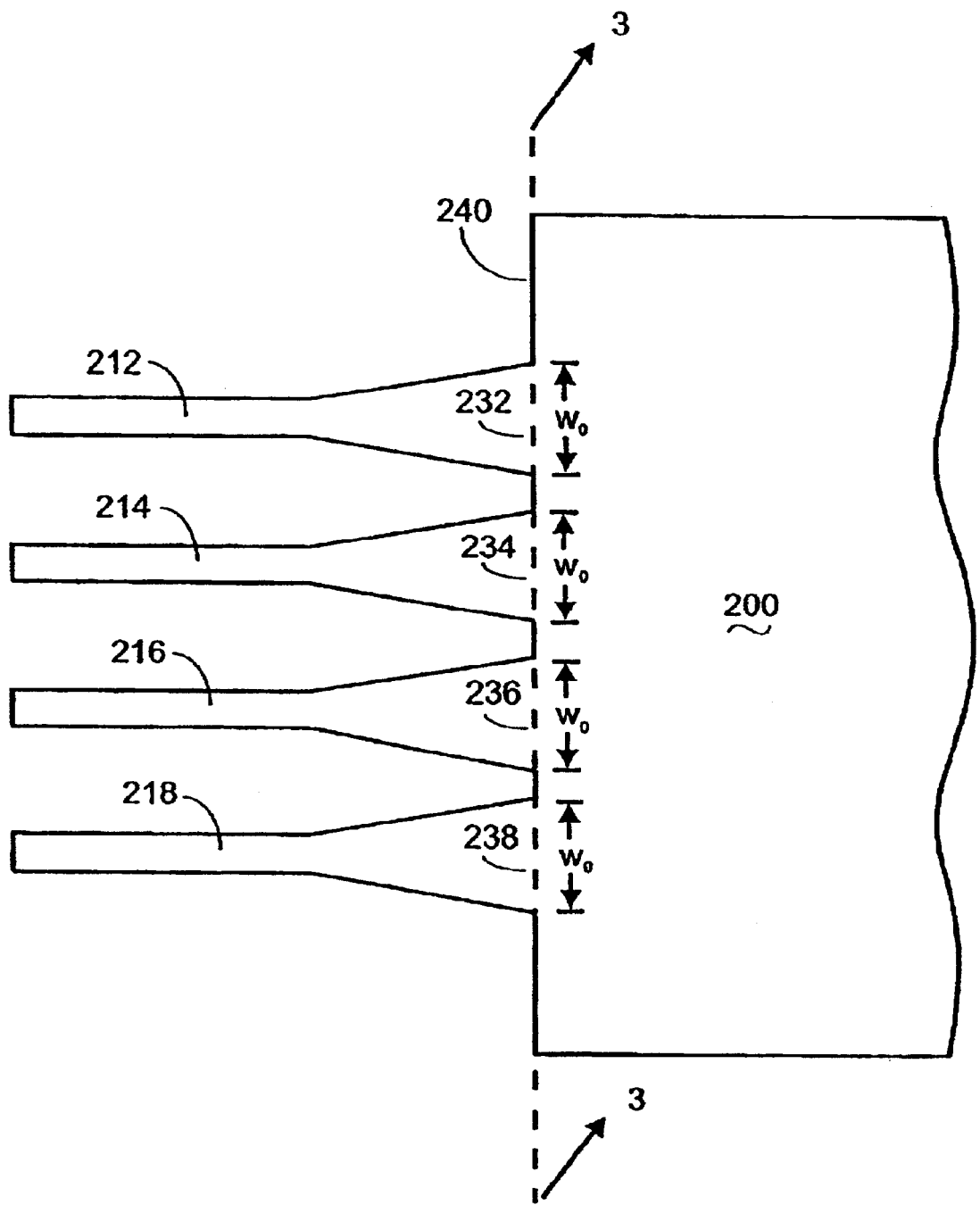
FIG. 2 is a schematic diagram of a portion of a conventional WGR where the entrances to the output waveguides have a constant size.

Turning now to Prior Art FIG. 2, a portion of a conventional WGR is illustrated. Such a conventional WGR has output waveguides (e.g., 212, 214, 216, 218) that collect light directed on them from an output slab waveguide 200, where the output waveguides are substantially similar in width at the receiving ends of the output waveguides (e.g., 232, 234, 236, 238) where they join the output slab waveguide 200 at the delivering end of the output slab waveguide 240. For example, the receiving end of the output waveguide 212 is of width $w_0$, while the receiving ends of the output waveguides 214, 216 and 218 are also $w_0$.

Figure 3:
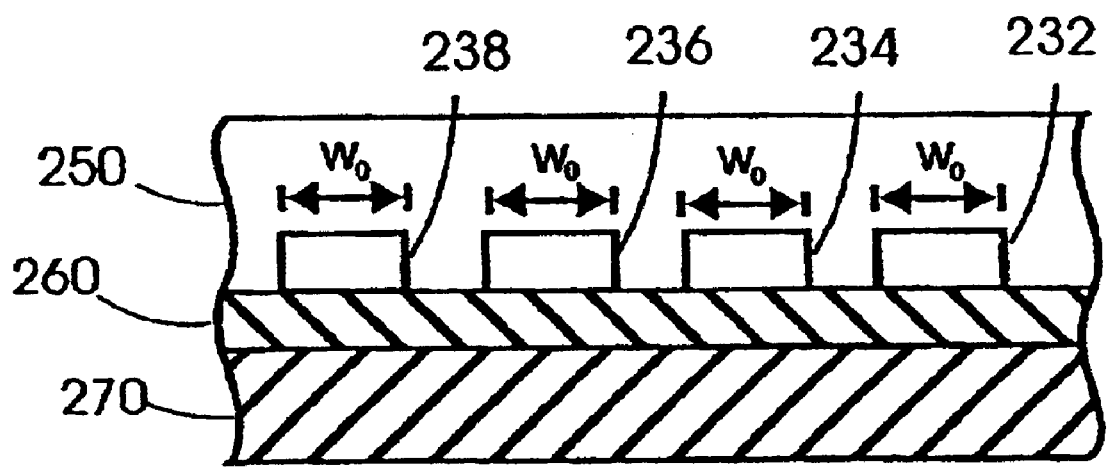
FIG. 3 is a schematic diagram of a cross-sectional view of portion of a conventional WGR where the entrances to the output waveguides have a constant size.

The uniformity of widths is further exemplified in the FIG. 3, wherein the output waveguides (e.g., 212, 214, 216, 218) are illustrated in cross-section taken through their receiving ends. The receiving ends of the output waveguides (e.g., 232, 234, 236, 238) are typically surrounded by a top cladding 250 and a bottom cladding 260, which is deposited on substrate 270. Since the transfer function that is associated with each channel is determined, at least in part, by the width of the receiving end of the output waveguide where it is optically coupled to the slab waveguide, in a conventional WGR, such uniformity of widths has implications on the variation of the transfer functions, as exemplified in detail in the following equations and the discussion surrounding the following equations. However, the variation in the transfer functions that is provided by a uniformity in the widths of the receiving ends of the output waveguides may not facilitate optimizing the transfer function for each individual channel. For example, producing a frequency-limited bandwidth that is uniform may be desired.

Figure 4:
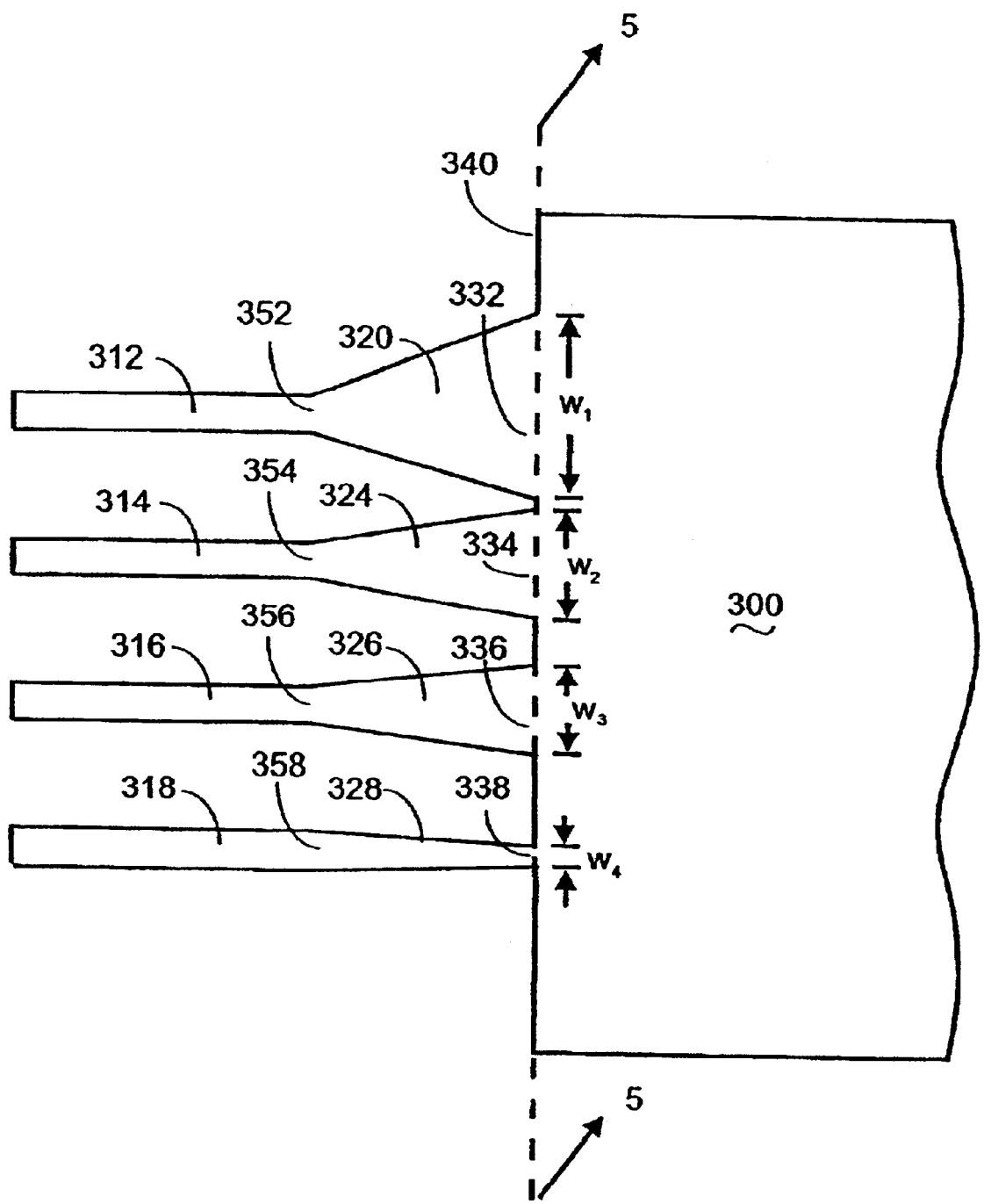
FIG. 4 is a schematic diagram of a WGR illustrating entrances to output waveguides of various widths, in accordance with an aspect of the present invention.

Turning now to FIG. 4, one aspect of the present invention is illustrated. In one aspect of the present invention, the output waveguides (e.g., 312, 314, 316, 318) are configured such that the receiving ends of the output waveguides (e.g., 332, 334, 336, 338) have various widths. Thus, in the present invention, as opposed to the uniform widths $w_0$ of the receiving ends of the output waveguides, the widths of the receiving ends of the output waveguides may be varied and manipulated to facilitate achieving the desired effect on the transfer function. For example, the receiving end of the output waveguide 312 is of width $w_1$, while the receiving ends of the output waveguide 314 is of width $w_2$, where is $w_2$ smaller than $w_1$, 316 is of width $w_2$, where is $w_2$ smaller than $w_1$, and 316 is of width $w_3$, where is $w_3$ smaller than $w_2$.

FIG. 4 illustrates the output waveguides 312, 314, 316 and 318 comprising tapered regions 332, 334, 336 and 338 respectively, herein referred to as output tapers. Such output tapers are preferred for this invention; however, such output tapers are not required for this invention. The output tapers have receiving ends (e.g. 332, 334, 336, 338) and delivering ends (e.g., 352, 354, 356, 358). As illustrated, the output tapers may configured such that the receiving end of the output taper coincides with the receiving end of the output waveguides (e.g., 332, 334, 336, 338). Alternatively, the output tapers may configured such that the receiving end of the output taper does not coincide with the receiving end of the output waveguides (not shown). As illustrated, the output tapers are configured such that the delivering ends of the output tapers (e.g., 352, 354, 356, 358) are configured to have a uniform width for all output waveguides. Alternatively, the output tapers are configured such that the delivering ends of the output tapers are configured to have a non-uniform width for some or all output waveguides (not shown). Typically, the output tapers are configured such that the delivering ends are narrower than the receiving ends (e.g., 352, 354, 356). Alternatively, the output tapers are configured such that the some or all of the delivering ends are broader than the receiving ends (not shown). As illustrated, the output tapers are configured such that the delivering ends of the output tapers (e.g., 352, 354, 356, 358) are configured to have a uniform width for all output waveguides. Alternatively, the output tapers are configured such that some or all of the delivering ends of the output tapers are configured to have a non-uniform width for all output waveguides (not shown).

Figure 5:
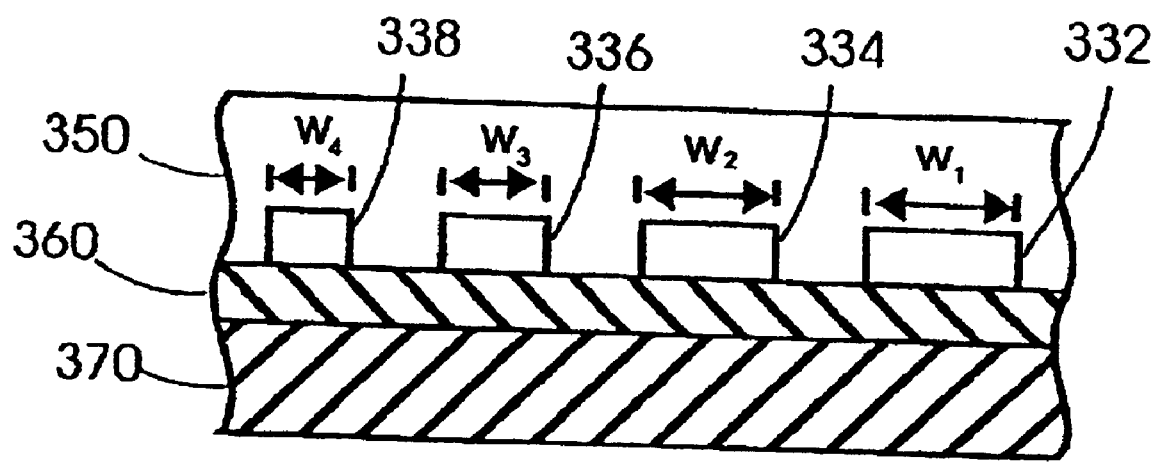
FIG. 5 is a schematic diagram of a cross-sectional view of a WGR illustrating entrances to output waveguides of various widths, in accordance with an aspect of the present invention.

The variation of widths or the receiving ends of the output waveguides is further exemplified in the FIG. 5, wherein the output waveguides (e.g., 312, 314, 316, 318) are illustrated in cross-section taken through their receiving ends (e.g., 332, 334, 336, 338). The output waveguides may be surrounded by a top cladding 350 and a bottom cladding 360, which are deposited on substrate 370; however, the invention is not so limited. Since the transfer function that is associated with each channel is determined, at least in part, by the width of the receiving end of the output waveguide where it is optically coupled to the slab waveguide 300, such variation of widths has implications on the variation of the transfer functions, as exemplified in detail in the following equations and the discussion surrounding the following equations. Particular aspects of the transfer function may be characterized by a figure of merit.

The widths of the receiving ends of at least a subset of the output waveguides of this invention may be varied so as to provide for a figure of merit that has a substantially uniform value, i.e. a value that is substantially the same for the subset of output waveguides. In this context, "a substantially uniform value" implies that the variance of the value is less than the variance of the value for a similar WGR in which all the receiving ends have a common width that is equal to the mean width of the receiving ends of this invention. That is, the invention reduces the variance of a particular figure of merit. Frequency-limited bandwidth may be used as a figure of merit. Alternatively, "figure of merit" may refer to one or more of: wavelength-limited bandwidth, wavelength-limited adjacent isolation, frequency-limited adjacent isolation, and insertion loss, for example.

Turning now to a mathematical estimation of the variation of the width of the receiving end of the output waveguides that is required to provide a uniform figure of merit, and assuming that all the receiving ends of the output waveguides are coupled to the output slab waveguide along the output focal curve, the figure of merit, denoted by "y," varies from one output waveguide to another according to $$\frac{dy}{dq} = \frac{\partial y}{\partial w}\bigg|_v \frac{dw}{dq} + \frac{\partial y}{\partial v}\bigg|_w \frac{dv}{dq}, \tag{1}$$

where q is an integer that identifies a particular output waveguide, w is the width of the receiving end of the waveguide and v is the central frequency of the passband for the particular output waveguide. Equivalently, $$\frac{dy}{dq} = \frac{\partial y}{\partial w}\bigg|_\lambda \frac{dw}{dq} + \frac{\partial y}{\partial \lambda}\bigg|_w \frac{d\lambda}{dq}, \quad (2)$$

where λ represents the central wavelength of the passband. Recall that the central wavelength is related to the central frequency according to $$\nu\lambda = c, \quad (3)$$

where c is the speed of light in a vacuum. dλ/dq represents the difference in central wavelength between passbands of adjacent output waveguides and dν/dq represents the difference in central frequency between passbands of adjacent output waveguides, each of which is sometimes referred to as the "channel separation." According to equations 1 and 2, a uniform value for y is provided when the receiving end of the output waveguide varies according to $$\frac{dw}{dq} = -\frac{\frac{\partial y}{\partial \lambda}\big|_w \frac{d\lambda}{dq}}{\frac{\partial y}{\partial w}\big|_\lambda} = -\frac{\frac{\partial y}{\partial \nu}\big|_w \frac{d\nu}{dq}}{\frac{\partial y}{\partial w}\big|_\nu}. \quad (4)$$

For example, using δν as the figure of merit, equation 4 becomes $$\frac{dw}{dq} = -\frac{\frac{\partial \delta\nu}{\partial \lambda}\big|_w \frac{d\lambda}{dq}}{\frac{\partial \delta\nu}{\partial w}\big|_\lambda} = -\frac{\frac{\partial \delta\nu}{\partial \nu}\big|_w \frac{d\nu}{dq}}{\frac{\partial \delta\nu}{\partial w}\big|_\nu}. \quad (5)$$

Using the relation $$\frac{\delta\nu}{\nu} = \frac{\delta\lambda}{\lambda}, \quad (6)$$

which may be derived from equation 3, equation 5 may also be written as $$\frac{dw}{dq} = -\frac{\left(\frac{2\delta\lambda}{\lambda} + \frac{\partial \delta\lambda}{\partial \lambda}\big|_w\right)\frac{d\lambda}{dq}}{\frac{\partial \delta\lambda}{\partial w}\big|_\lambda}. \quad (7)$$

Turning now to an example of the invention that is based on theoretical equations that relate the bandwidth to the output waveguide width and the wavelength, the Gaussian-WGR is examined. A theoretical approximation for the wavelength-limited bandwidth is $$\delta\lambda = \frac{\sqrt{R/2}}{5.224}\sqrt{(w_1^2 + w^2)}\bigg/\frac{dx}{d\lambda}, \quad (8)$$

where dx/dλ is the spatial dispersion provided by the AWG, $w_1$ is the width of the delivering end of the input waveguide, and R is the reference level that is applied for the determination of the wavelength-limited bandwidth. Since the spatial dispersion provided by the AWG is independent of wavelength, equation 8 yields $$\frac{\partial \delta\lambda}{\partial \lambda}\bigg|_w = 0, \text{ and,} \quad (9)$$

$$\frac{\partial \delta\lambda}{\partial w}\bigg|_\lambda = \frac{w\delta\lambda}{w_1^2 + w^2}. \quad (10)$$

Inserting equation 9 and 10 into equation 7 yields $$\frac{dw}{dq} = 2\frac{w_1^2 + w^2}{wv}\frac{d\nu}{dq}. \quad (11)$$

That is, equation 11 determines the variation for the width of the receiving end of the output waveguide that provides a uniform frequency-limited bandwidth within the theoretical approximation used herein for the Gaussian-WGR. In one embodiment, the difference in width between the receiving ends of two adjacent channel/output waveguides has a value that is within a factor of about ten of a value determined from equation 11. In another embodiment, the difference in width between the receiving ends of two adjacent channel/output waveguides has a value that is within a factor of about two of a value determined from equation 11. In yet another embodiment, the difference in width between the receiving ends of two adjacent channel/output waveguides has a value that is within about 25% of a value determined from equation 11.

One consequence of equation 11 is $$\Delta w = 2\frac{w_1^2 + w^2}{wv}\Delta v, \quad (12)$$

where Δw=|dw/dq| and Δv=|dv/dq|. In one embodiment, the difference in width between the receiving ends of two adjacent channel/output waveguides has a value that is within a factor of about two of a value determined from equation 12.

Equation 8 and equation 9 are typically less accurate for a passband-flattened WGR than for a Gaussian-WGR. Nevertheless, the experimental results described below suggest that, even for passband-flattened WGRs, equation 11 predicts a value of dw/dq that is within about 25% of an optimal value. Accordingly, varying the width of the receiving ends of the output waveguides according to equation 11 reduces the variation of the frequency-limited bandwidth, i.e., provided that varying the width of the receiving ends of the output waveguides according to equation 11, the frequency-limited bandwidth is substantially uniform.

Figure 8:
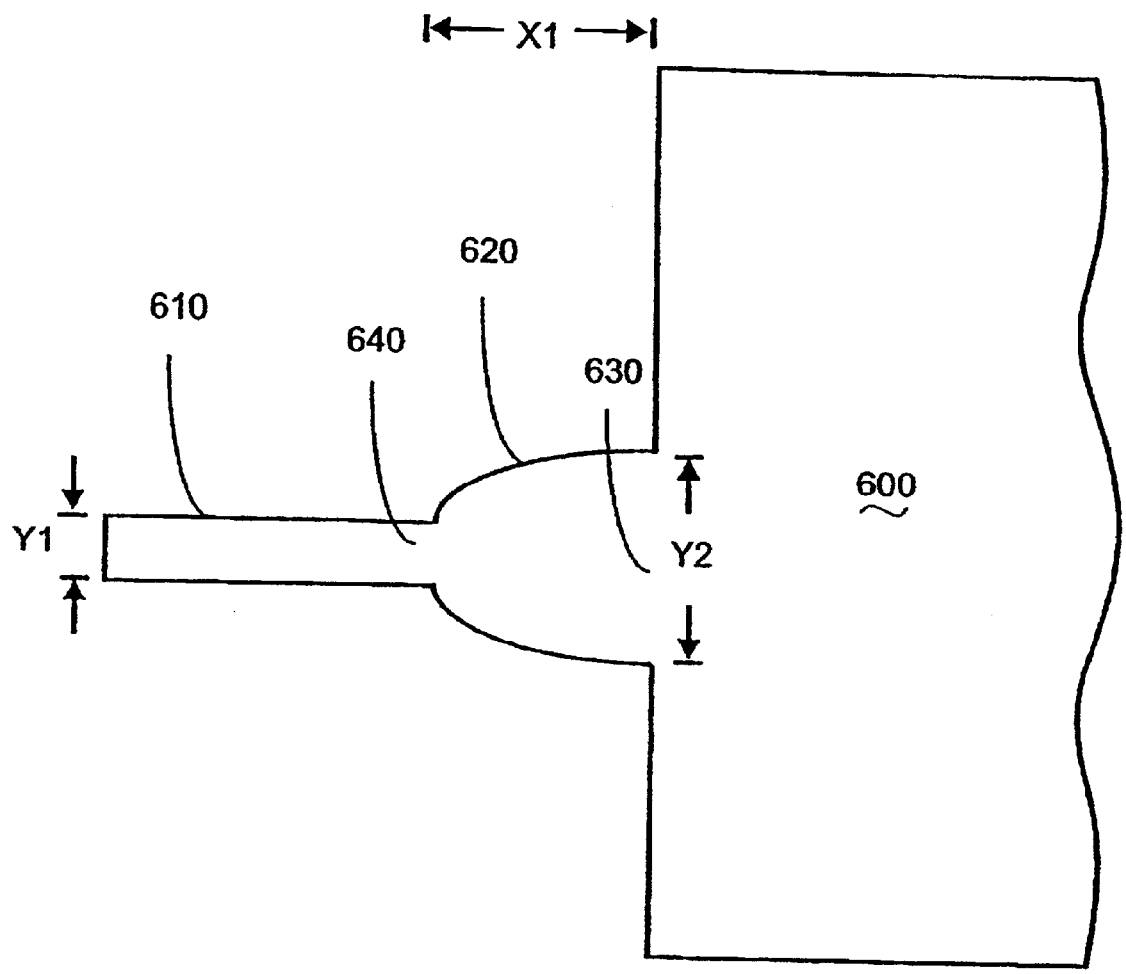
FIG. 8 is a schematic diagram of a WGR illustrating input taper, in accordance with an aspect of the present invention.

It can be appreciated that the design of the input taper, in part, may determine an optimal variation of the widths of the receiving ends of the output tapers. FIG. 8 illustrates an input waveguide 610 that is fashioned with a taper 620. In this illustrative example, the delivering end of the input taper 630, which is optically coupled to the slab waveguide 600, is wider than the receiving end of the input taper 640; however, other variations may also be used with the present invention. The width of the input taper 620 may increase according to a parabolic function, as schematically illustrated in FIG. 8. Such a taper 620 is referred to herein as a parabolic taper.

Figure 9:
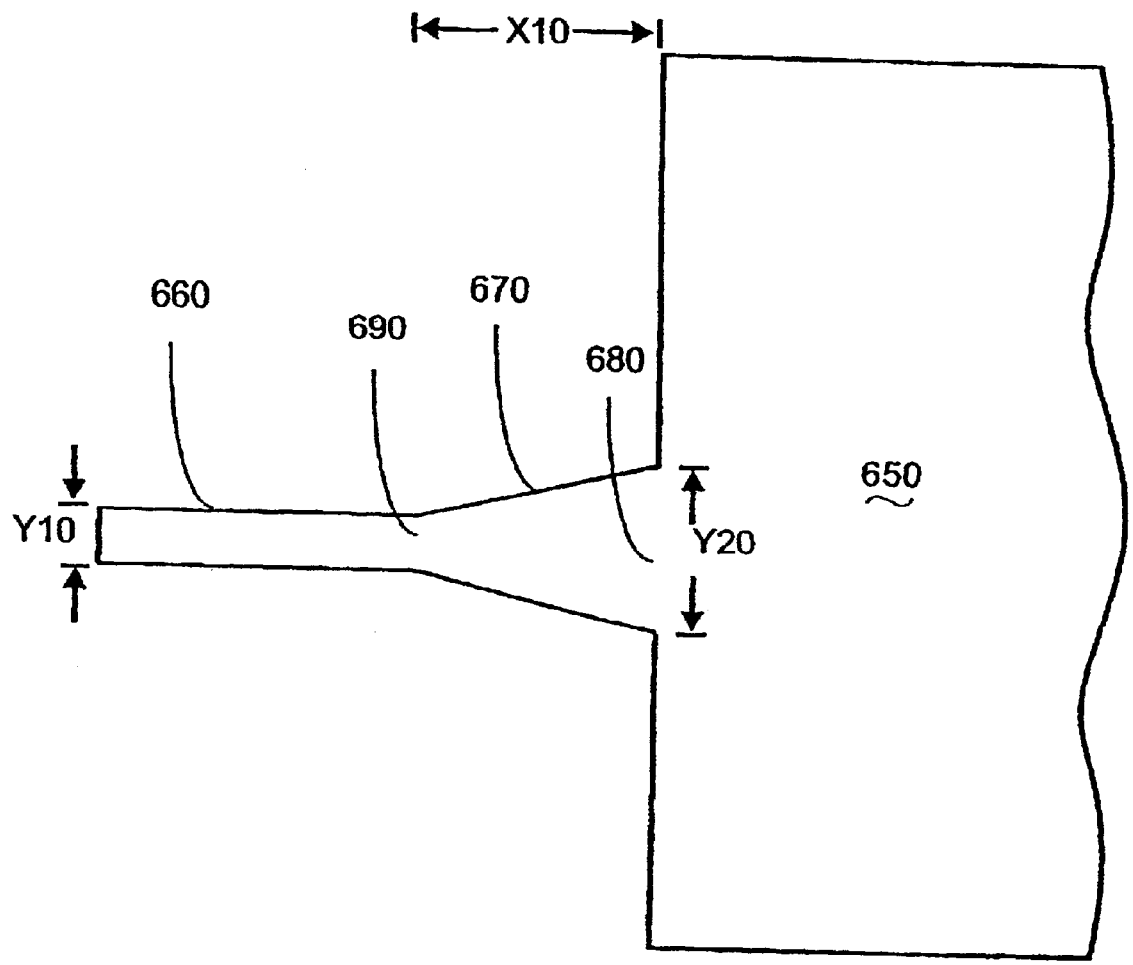
FIG. 9 is a schematic diagram of a WGR illustrating output taper, in accordance with an aspect of the present invention.

Similarly, FIG. 9 illustrates an output waveguide 660 that is fashioned with an output taper 670. As illustrated, the receiving end of the output taper 680 is optically coupled to an output slab waveguide 650 and is wider than the delivering end of the output taper 690. The width of the output taper 670 may increase according to a linear function, as schematically illustrated in FIG. 9. Such a taper 670 is referred to herein as a parabolic taper.

In one embodiment of the present invention, the input taper 620 parabolically increases in width from about 7 μm to about 27 μm over a length of about 260 μm, and the output taper 670 linearly increases in width from about 7 μm to about 14 μm over a length of about 700 μm. In this embodiment, the top cladding 350, bottom cladding 360 and the waveguides comprise silica glass, and the substrate 370 comprises a silicon wafer. The variation of the width of the receiving ends of the output waveguides that optimally provided for a uniform frequency-limited bandwidth was determine to be 22% larger than the value according to equation 11.

While a first parabolic input taper 620 design and measurement is described, it is to be appreciated that other input taper 620 designs and sizes may be employed in accordance with the present invention. Similarly, while a linear output taper 670 design and measurement is described, it is to be appreciated that other output taper 670 designs and sizes may be employed. For example, in one embodiment of the present invention, the input taper 620 may vary from a narrow width Y1 to a wide width Y2 along a distance of X1, where Y1 is between about 4 μm and about 10 μm, Y2 is larger than Y1 by an amount that is between about 0 um and about 30 μm and X1, the taper length, is between about 100 and about 400 μm. In another embodiment of the present invention, the input taper 670 may vary from a narrow width Y1 to a wide width Y2 along a distance of X1, where Y1 is between about 6 μm and about 8 μm, Y2 is larger than Y1 by an amount that is between about 17 μm and about 23 μm, and X1 is between about 200 μm and about 330 μm. Similarly, in one embodiment of the present invention, the output taper 660 may vary from a narrow width Y10 to a wide width Y20 along a distance of X10, where Y10 is between about 4 μm and about 10 μm, Y20 is larger the Y10 by an amount that is between about 0 and about 20 μm, and X10, the taper length, is between about 100 μm and about 2000 μm. In another embodiment of the present invention, the output taper 660 may vary from a narrow width Y10 to a wide width Y20 along a distance of X10, where Y10 is between about 6 μm and about 8 μm, Y20 is larger the Y10 by an amount that is between 4 and 10 μm, and X10 is between about 400 μm and about 1000 μm. Furthermore, the tapers 620 and 670 may take various shapes including, but not limited to, parabolic and linear shapes.

Figure 6:
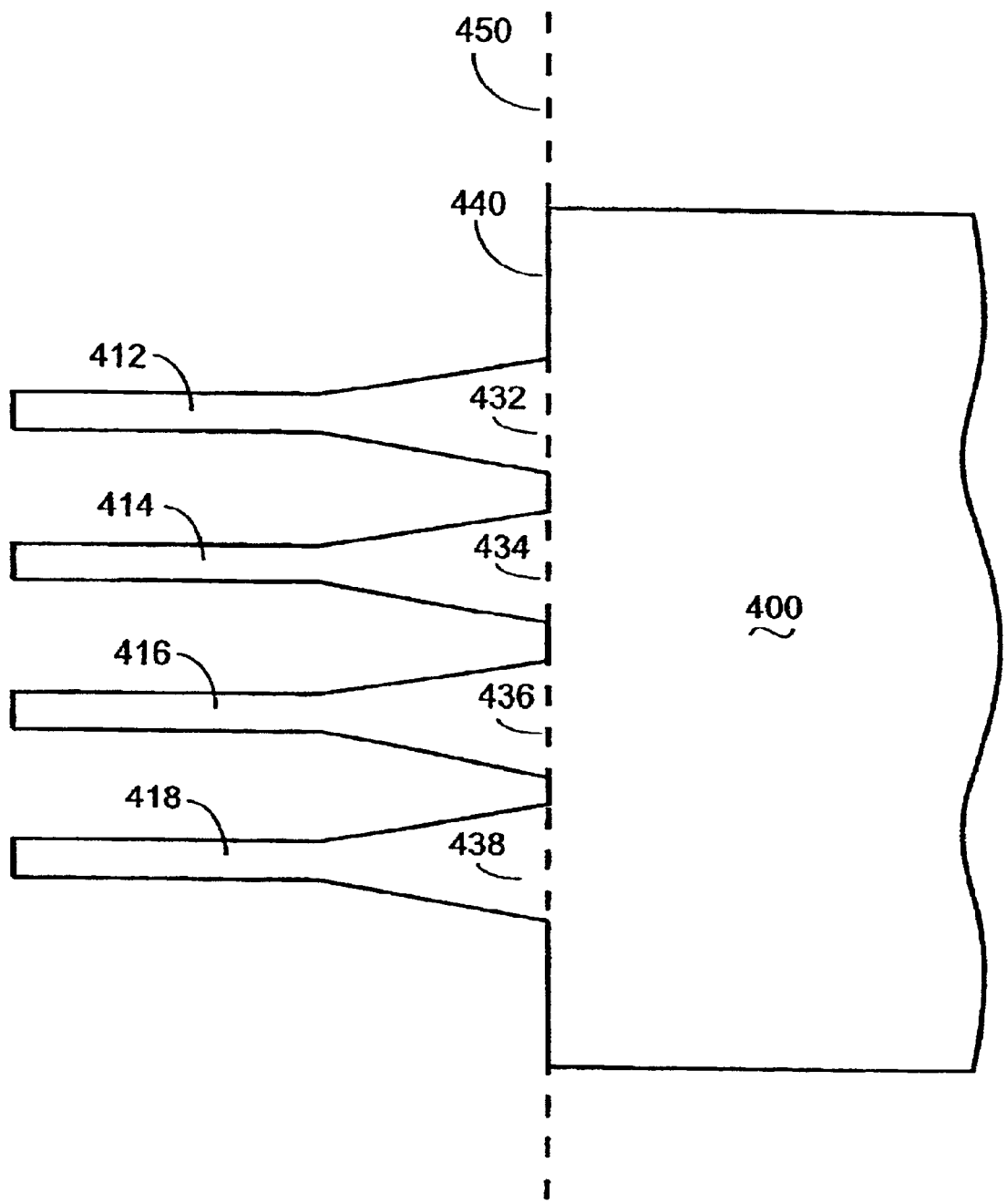
FIG. 6 is a schematic diagram of a portion of a conventional WGR where the entrances to the output waveguides are substantially on the output focal curve.

Turning now to Prior Art FIG. 6, conventionally, output waveguides (e.g. 412, 414, 416, 418) are configured such that the receiving ends of the output waveguides 432, 434, 436 and 438 are positioned on the output focal curve 450. That is, in the vicinity of the receiving ends of the output waveguide (e.g. 432, 434, 436, 438), the output slab waveguide 400 has a delivering end 440 that is situated close to the output focal curve 450.

Figure 7:
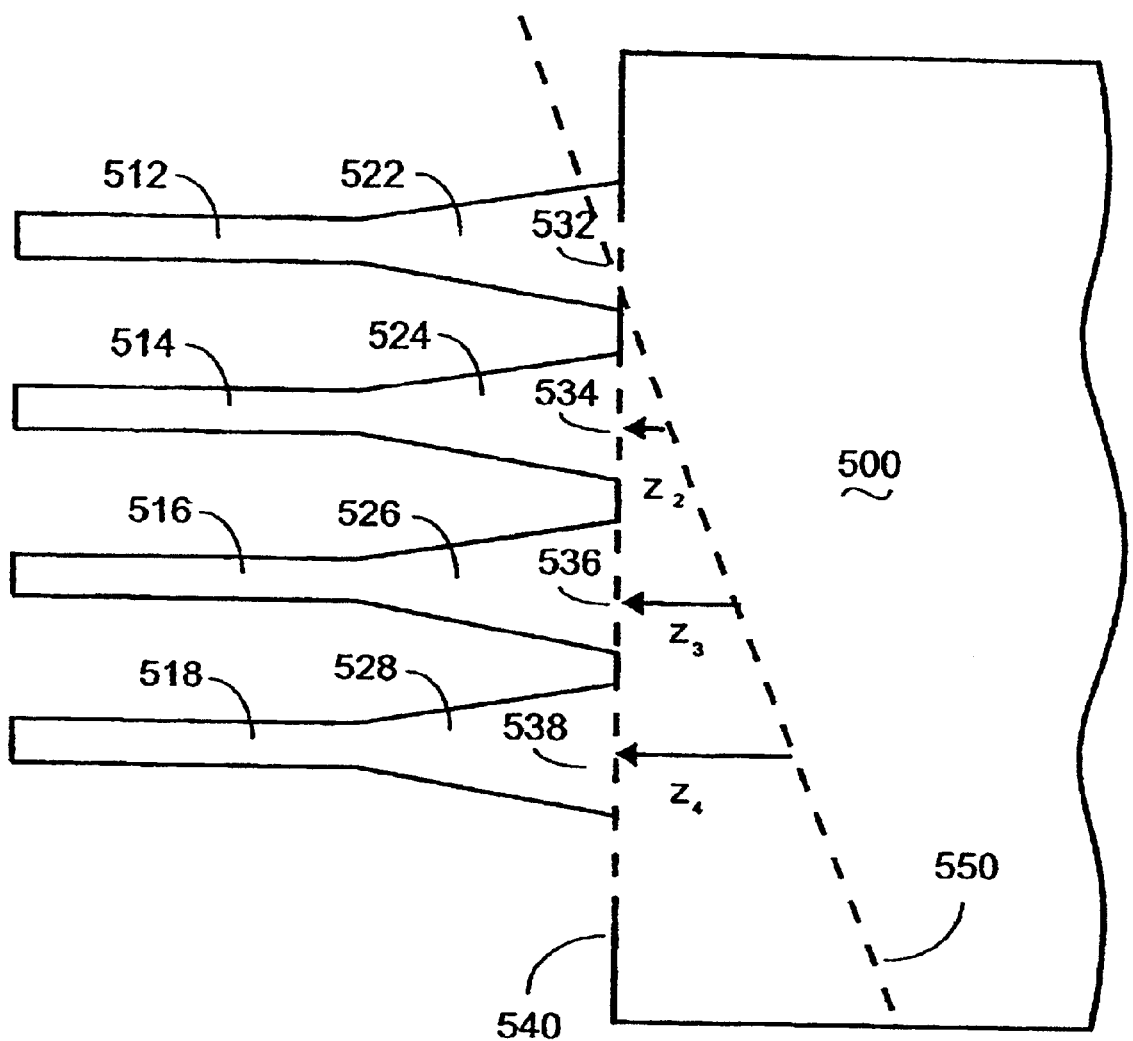
FIG. 7 is a schematic diagram of a WGR illustrating delivery end shaping in accordance with an aspect of the present invention.

FIG. 7 illustrates a portion of a WGR where the output waveguides (e.g. 512, 514, 516, 518) are configured such that the receiving ends of the output waveguides 532, 534, 536 and 538 are positioned at pre-determined locations relative to the focal curve 550. The displacement, in the longitudinal direction, between the receiving end of the output waveguide from the output focal curve herein is referred to as the "defocusing displacement" and is herein denoted by "z." Herein, the defocusing displacement has the sign convention that makes it positive for a displacement away from the AWG and that makes it negative for displacements towards the AWG. For example, the defocusing displacements illustrated in FIG. 7 are either zero or positive. The invention is not limited to defocusing displacements of a particular sign. For example, one variation may have all defocusing displacements that are positive; a second variation may have all defocusing displacements that are negative; a third variation may have some defocusing displacements that are positive, some defocusing displacements that are negative, and some defocusing displacements that are zero.

By way of illustration, the receiving end of a first output waveguide 532 is positioned substantially on the focal curve 550. Thus, a measurement $z_1$ of the displacement from the waveguide 532 to the focal curve 550 (i.e. the defocusing displacement) is substantially zero. By way of further illustration, the receiving end of a second output waveguide 534 is positioned off the focal curve 550, and thus a measurement $z_2$ of the displacement from the output waveguide 534 to the focal curve 550 (i.e. the defocusing displacement) is greater than zero. By way of still further illustration, a third output waveguide 536 is positioned still further off the focal curve 550 than output waveguide 534, and thus a measurement $z_3$ of the displacement from the output waveguide 536 to the focal curve 550 (i.e. the defocusing displacement) is greater than measurement $z_2$. The output slab waveguide 500 has a delivering end 540 that may be fabricated to facilitate such location of the receiving ends of the output waveguides.

In one embodiment, adjacent output waveguides have receiving ends with widths that have values that are different by an amount that is between about 0.01 μm and about 0.25 μm. In another embodiment, adjacent output waveguides have receiving ends with widths that have values that are different by an amount that is between about 0.05 μm and about 0.1 μm.

By arranging the receiving ends of the waveguides at positions off the focal curve 550, the optical coupling of light emerging from a grating region of the WGR onto an output waveguide is manipulated according to by the defocusing displacement z to facilitate optimizing the transfer function and/or that facilitate improving WGR parameters like bandwidth, channel isolation, and insertion loss. Particular aspects of the transfer function may be characterized by a figure of merit.

The defocusing displacements of at least a subset of the output waveguides of this invention may be varied so as to provide for a figure of merit that has a substantially uniform value, i.e. a value that is substantially the same for said subset of output waveguides. In this context, "a substantially uniform value" implies that the variance of the value is less than the variance of the value for a similar WGR in which all the defocusing displacements are zero. That is, the invention reduces the variance of a particular figure of merit. Frequency-limited bandwidth may be used as a figure of merit. Alternatively, "figure of merit" may refer to one or more of: wavelength-limited bandwidth, wavelength-limited adjacent isolation, frequency-limited adjacent isolation, and insertion loss, for example.

Turning now to a mathematical estimation of the variation of the defocusing displacement of the receiving end of the output waveguides that is required to provide a uniform figure of merit, and assuming that the receiving ends of the output waveguides are uniform in width, the figure of merit, denoted by "y," varies from one output waveguide to another according to $$\frac{dy}{dq} = \frac{\partial y}{\partial z}\bigg|_v \frac{dz}{dq} + \frac{\partial y}{\partial v}\bigg|_z \frac{dv}{dq}, \quad (13)$$

where, as in previous equations, q is an integer that identifies a particular output waveguide, z is the defocusing displacement and v is the central frequency of the passband for the particular output waveguide. Equivalently, $$\frac{dy}{dq} = \frac{\partial y}{\partial z}\bigg|_\lambda \frac{dz}{dq} + \frac{\partial y}{\partial \lambda}\bigg|_z \frac{d\lambda}{dq}, \quad (14)$$

where $\lambda$ represents the central wavelength of the passband. According to equations 13 and 14, a uniform value for y is provided when the defocusing displacement varies according to $$\frac{dz}{dq} = -\frac{\frac{\partial y}{\partial \lambda}\big|_z \frac{d\lambda}{dq}}{\frac{\partial y}{\partial z}\big|_\lambda} = -\frac{\frac{\partial y}{\partial v}\big|_z \frac{dv}{dq}}{\frac{\partial y}{\partial z}\big|_v}. \quad (15)$$

For example, using $\delta v$ as the figure of merit, equation 15 becomes $$\frac{dw}{dq} = -\frac{\frac{\partial \delta v}{\partial \lambda}\big|_w \frac{d\lambda}{dq}}{\frac{\partial \delta v}{\partial w}\big|_\lambda} = -\frac{\frac{\partial \delta v}{\partial v}\big|_w \frac{dv}{dq}}{\frac{\partial \delta v}{\partial w}\big|_v}. \quad (16)$$

Equation 16 may also be written as $$\frac{dw}{dq} = -\frac{\left(\frac{2\delta\lambda}{\lambda} + \frac{\partial \delta\lambda}{\partial \lambda}\big|_z\right)\frac{d\lambda}{dq}}{\frac{\partial \delta\lambda}{\partial z}\big|_\lambda} \quad (17)$$

Turning now to an example of the invention that is based on theoretical equations that relate the bandwidth to the defocusing displacement and the wavelength, the Gaussian-WGR is examined. For illustrative purposes only, the following relationship between wavelength-limited bandwidth and defocusing displacement is assumed to be $$\delta\lambda = \frac{\sqrt{R/2}}{5.224}\sqrt{(w_1^2 + (\theta z)^2 + w^2)} \bigg/ \frac{dx}{d\lambda}, \quad (18)$$

where $\theta$ represents a beam expansion parameter, which, for illustrative purposes only, is assumed to be given by $$\theta = \lambda/\pi w_1, \quad (19)$$

in accordance to Gaussian beam optics. Although, equations 18 and 19 have been derived by expanding the waist of the focused image of a beam according to Gaussian beam optics, the invention does not depend on this relationship. In the following discussion, the wavelength dependence of $\theta$ is neglected. Since the spatial dispersion provided by the WGR is independent of wavelength, equation 18 yields $$\frac{\partial \delta\lambda}{\partial \lambda}\bigg|_z = 0, \text{ and,} \quad (20)$$

$$\frac{\partial \delta\lambda}{\partial z}\bigg|_\lambda = \frac{\theta^2 z \delta\lambda}{w_1^2 + (\theta z)^2 + w^2}. \quad (21)$$

Inserting equation 20 and 21 into equation 17 yields $$\frac{dz}{dq} = 2\frac{w_1^2 + (\theta z)^2 + w^2}{\theta^2 z v}\frac{dv}{dq}. \quad (22)$$

That is, equation 22 determines the variation for the defocusing displacement that provides a uniform frequency-limited bandwidth within the theoretical approximation used herein. In one embodiment, the difference in defocusing displacements between two adjacent output waveguides has a value that is within a factor of about ten of a value determined from the equation 22. In another embodiment, the difference in defocusing displacements between two adjacent output waveguides has a value that is within a factor of about two of a value determined from the equation 22.

Furthermore, the defocusing displacements can be configured to facilitate achieving a substantially uniform value for the isolation between adjacent channels and/or to provide a substantially uniform value for peak transmissivity (e.g., insertion loss) between the channels. Insertion loss may be affected, for example, by how efficiently an optical beam couples into and output waveguide as a function of the defocusing displacement. Such efficiency may depend, for example, on the width of the output waveguide taper 670 and/or on the diffraction pattern provided by a grating region of a WGR. Thus, the defocusing displacement can be adjusted to facilitate achieving substantially uniform insertion loss.

By arranging the receiving ends of the waveguides at positions off the focal curve 550, and by simultaneously arranging the receiving ends of the output waveguide to have varied widths, improvements to the WGR can be realized.

Turning now to a mathematical estimation how a first figure of merit, $y_1$, varies according to the variation of the width of the receiving end of the output waveguides and the variation of the defocusing lengths, and assuming that variation occurs in both the width of the receiving end of the output waveguides and the defocusing distances, the variation in the first figure of merit is $$\frac{dy_1}{dq} = \frac{\partial y_1}{\partial w}\bigg|_{\lambda,z}\frac{dw}{dq} + \frac{\partial y_1}{\partial z}\bigg|_{\lambda,w}\frac{dz}{dq} + \frac{\partial y_1}{\partial \lambda}\bigg|_{w,z}\frac{d\lambda}{dq}. \quad (23)$$

Similarly, the variation in a second figure of merit, $y_2$ is given by $$\frac{dy_2}{dq} = \frac{\partial y_2}{\partial w}\bigg|_{\lambda,z}\frac{dw}{dq} + \frac{\partial y_2}{\partial z}\bigg|_{\lambda,w}\frac{dz}{dq} + \frac{\partial y_2}{\partial \lambda}\bigg|_{w,z}\frac{d\lambda}{dq}. \quad (24)$$

Substantially uniform value for both the first figure of merit and the second figure of merit simultaneously can be provided by simultaneously varying both the width of the receiving end of the output waveguides and the defocusing displacements such that the following system of equations is satisfied:

$$0 = \frac{\partial y_1}{\partial w}\bigg|_{\lambda,z}\frac{dw}{dq} + \frac{\partial y_1}{\partial z}\bigg|_{\lambda,w}\frac{dz}{dq} + \frac{\partial y_1}{\partial \lambda}\bigg|_{w,z}\frac{d\lambda}{dq} \quad (25)$$

$$0 = \frac{\partial y_2}{\partial w}\bigg|_{\lambda,z}\frac{dw}{dq} + \frac{\partial y_2}{\partial z}\bigg|_{\lambda,w}\frac{dz}{dq} + \frac{\partial y_2}{\partial \lambda}\bigg|_{w,z}\frac{d\lambda}{dq}.$$

As can be appreciated by one skilled in the art, the principles outlined herein may be applied to an optical apparatus other than a WGR that is based on AWGs. In particular, the same principles can be applied to an integrated optical reflection grating. Also the principles may be applied to an optical apparatus featuring bulk optical components, such as lenses and bulk-optic diffraction gratings.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An optical apparatus, comprising:
   one or more slab waveguides; and
   two or more output waveguides each having a first end optically coupled to the slab waveguide,
   where the first ends of the output waveguides coupled to the slab waveguide are of various widths and at least two of the widths are different, where the widths of the output waveguides are selected such that transfer functions, each associated with a particular output waveguide, are substantially uniform with respect to a figure of merit,
   wherein a difference in width between the first ends of two adjacent output waveguides has a value that is within a factor of about ten of a value determined from the equation:

$$\frac{dw}{dq} = 2\frac{w_1^2 + w^2}{wv}\frac{dv}{dq}$$

wherein q is an integer identifying a particular output waveguide, w is the width of the first end of the output waveguide, and v is a central frequency of a passband for the particular output waveguide.

2. The apparatus of claim 1, where the figure of merit is a frequency-limited bandwidth of a passband associated with a particular output waveguide.

3. The apparatus of claim 1, where the figure of merit is a wavelength-limited bandwidth of a passband associated with a particular output waveguide.

4. The apparatus of claim 1, where the figure of merit is a frequency-limited adjacent isolation associated with a particular output waveguide.

5. The apparatus of claim 1, where the figure of merit is a wavelength-limited adjacent isolation associated with a particular output waveguide.

6. The apparatus of claim 1, where the figure of merit is an insertion loss associated with a particular output waveguide.

7. The apparatus of claim 1, where the figure of merit is a mathematical function of bandwidth, adjacent isolation, and insertion loss associated with a particular output waveguide.

8. The apparatus of claim 1, where the optical apparatus at least one of a 1×N demultiplexer, an M×1 multiplexer, and an M×N router, M and N are individually integers from about 1 to about 200.

9. An optical apparatus comprising:
   an input slab waveguide;
   an output slab waveguide optically connected to the input slab waveguide via an arrayed waveguide grating;
   at least one input waveguide comprising a delivering end, wherein the delivering end of the input waveguide is optically coupled to the input slab waveguide; and
   at least two output waveguides, each comprising a receiving end, wherein the receiving end of each output waveguide is optically coupled to the output slab waveguide, and where the widths of the receiving ends of output waveguides are selected such that transfer functions, each associated with a particular output waveguide, are substantially uniform with respect to a figure of merit.

10. The apparatus of claim 9, where:
    the input waveguide comprises an input taper comprising a receiving end and a delivering end and configured such that
    a length of the input taper is between about 100 $\mu$m and about 400 $\mu$m, and
    the receiving end of the input taper has a width that is between about 4 $\mu$m and about 10 $\mu$m, and
    the delivering end of the input taper is wider than the receiving end of the input taper by an amount that is between about 0 $\mu$m and about 30 $\mu$m; and
    the output waveguide comprises an output taper comprising an receiving end and a delivering end and configured such that;
    a length of the output taper is between about 100 $\mu$m and about 2000 $\mu$m, and
    the delivering end of the output taper is between about 4 $\mu$m and about 10 $\mu$m, and
    the receiving end of the output taper is wider than the narrow end of the output taper by an amount that is between 0 $\mu$m and 20 $\mu$m.

11. The apparatus of claim 10, where adjacent output waveguides have receiving ends with widths that have values that are different by an amount that is between about 0.05 $\mu$m and about 0.1 $\mu$m.

12. The apparatus of claim 10, where the apparatus comprises silica layers.

13. The apparatus of claim 9, wherein the output waveguides comprise an output taper comprising a narrow end and a wide end, the output taper having a first width at the wide end that is larger than a second width of the output taper at the narrow end.

14. The apparatus of claim 13, where a difference in width between the receiving ends of two adjacent output waveguides has a value that is within a factor of about two of a value determined from the equation:

$$\Delta w = 2\frac{w_1^2 + w^2}{wv}\Delta v$$

wherein w is the width of the receiving end of the output waveguide, and v is a central frequency of a passband for the particular output waveguide.

15. The apparatus of claim 9, where the figure of merit is an insertion loss associated with a particular output waveguide.

16. The apparatus of claim 9, where the figure of merit is a mathematical function of bandwidth, adjacent isolation, and insertion loss associated with a particular output waveguide.

17. The apparatus of claim 9, where a difference in width between the receiving ends of two adjacent output waveguides has a value that is within a factor of about ten of a value determined from the equation:

$$\frac{dw}{dq} = 2\frac{w_1^2 + w^2}{wv}\frac{dv}{dq}$$

wherein q is an integer identifying a particular output waveguide, w is the width of the receiving end of the output waveguide, and v is a central frequency of a passband for the particular output waveguide.

18. The apparatus of claim 9, where a difference in width between the receiving ends of two adjacent output waveguides has a value that is within a factor of about two of a value determined from the equation:

$$\frac{dw}{dq} = 2\frac{w_1^2 + w^2}{wv}\frac{dv}{dq}$$

wherein q is an integer identifying a particular output waveguide, w is the width of the receiving end of the output waveguide, and v is a central frequency of a passband for the particular output waveguide.

19. The apparatus of claim 9, where a difference in width between the receiving ends of two adjacent output waveguides has a value that is within about 25% of a value determined from the equation:

$$\frac{dw}{dq} = 2\frac{w_1^2 + w^2}{wv}\frac{dv}{dq}$$

wherein q is an integer identifying a particular output waveguide, w is the width of the receiving end of the output waveguide, and v is a central frequency of a passband for the particular output waveguide.

20. The apparatus of claim 9, where the figure of merit is a frequency-limited bandwidth of a passband associated with a particular output waveguide.

21. The apparatus of claim 9, where the figure of merit is a wavelength-limited bandwidth of a passband associated with a particular output waveguide.

22. The apparatus of claim 9, where:
the input waveguide comprises an input taper comprising an receiving end and a delivering end and configured such that
a length of the input taper is between about 200 μm and about 330 μm, and
the receiving end of the input taper has a width that is between about 6 μm and about 8 μm, and
the delivering end of the input taper is wider than the receiving end of the input taper by an amount that is between about 17 μm and about 23 μm; and
the output waveguide comprises an output taper comprising an receiving end and a delivering end and configured such that
a length of the output taper is between about 200 μm and about 1000 μm, and the delivering end of the output taper is between about 6 μm and about 8 μm, and
the receiving end of the output taper is wider than the narrow end of the output taper by an amount that is between about 4 μm and about 10 μm.

23. The apparatus of claim 9, where the figure of merit is a frequency-limited adjacent isolation associated with a particular output waveguide.

24. The apparatus of claim 9, where the figure of merit is a wavelength-limited adjacent isolation associated with a particular output waveguide.

25. The apparatus of claim 9, where the optical apparatus comprises at least one of a 1×N demultiplexer, an M×1 multiplexer, and an M×N router, wherein M and N are individually integers from about 1 to about 200.

26. An optical apparatus comprising:
an input slab waveguide;
an output slab waveguide optically connected to the input slab waveguide via an arrayed waveguide grating;
at least one input waveguide comprising a delivering end, wherein the delivering end of the input waveguide is optically coupled to the input slab waveguide; and
at least two output waveguides, each comprising a receiving end, wherein each receiving end of the output waveguide is optically coupled to the output slab waveguide, and where the receiving ends of the output waveguides are configured such that defocusing displacements are selected such that transfer function, each associated with a particular output waveguide, are substantially uniform with respect to a figure of merit.

27. The apparatus of claim 26, where a difference in defocusing displacements between two adjacent output waveguides has a value that is within a factor of about ten of a value determined from the equation:

$$\frac{dz}{dq} = 2\frac{w_1^2 + (\theta z)^2 + w^2}{\theta^2 zv}\frac{dv}{dq}$$

wherein q is an integer identifying a particular output waveguide, w is the width of the receiving end of the output waveguide, v is a central frequency of a passband for the particular output waveguide, □ is a beam expansion parameter, and z is a defocusing displacement.

28. The apparatus of claim 27, where a difference in defocusing displacements between two adjacent output waveguides has a value that is within a factor of about two of a value determined from the equation:

$$\frac{dz}{dq} = 2\frac{w_1^2 + (\theta z)^2 + w^2}{\theta^2 zv}\frac{dv}{dq}$$

wherein q is an integer identifying a particular output waveguide, w is the width of the receiving end of the output waveguide, v is a central frequency of a passband for the particular output waveguide, □ is a beam expansion parameter, and z is a defocusing displacement.

29. The apparatus of claim 26, where the figure of merit is a frequency-limited adjacent isolation associated with a particular output waveguide.

30. The apparatus of claim 26, where the figure of merit is a wavelength-limited adjacent isolation associated with a particular output waveguide.

31. The apparatus of claim 26, where the figure of merit is an insertion loss associated with a particular output waveguide.

32. The apparatus of claim 26, where the figure of merit is a mathematical function of bandwidth, adjacent isolation, and insertion loss associated with a particular output waveguide.

33. The apparatus of claim 26, where the figure of merit is a frequency-limited bandwidth of a passband associated with a particular output waveguide.

34. The apparatus of claim 26, where the figure of merit is a wavelength-limited bandwidth of a passband associated with a particular output waveguide.

35. An optical apparatus comprising:

an input slab waveguide;

an output slab waveguide optically connected to the input slab waveguide via an arrayed waveguide grating;

at least one input waveguide comprising a delivering end, wherein the delivering end of the input waveguide is optically coupled to the input slab waveguide; and at least two output waveguides, each comprising a receiving end, wherein each receiving end of the output waveguide is optically coupled to the output slab waveguide, and where the receiving ends of the output waveguides are configured with various defocusing displacements and various widths such that a variation in widths of the receiving ends of the output waveguides and a variation in the defocusing displacements of the receiving ends of output waveguides are simultaneously selected such that transfer functions, each associated with a particular output waveguide, are simultaneously provided with both a substantially uniform first figure of merit and a substantially uniform second figure of merit.

36. The apparatus of claim 35, wherein at least one of the first figure of merit and the second figure of merit are selected from the group consisting of wavelength-limited bandwidth, frequency-limited bandwidth, adjacent isolation, and insertion loss associated with a particular output waveguide.

* * * * *